April 2, 1940.  P. RAVIGNEAUX  2,195,783
GEAR BOX WITH FREEWHEELING GEAR
Filed Dec. 29, 1937   2 Sheets—Sheet 1
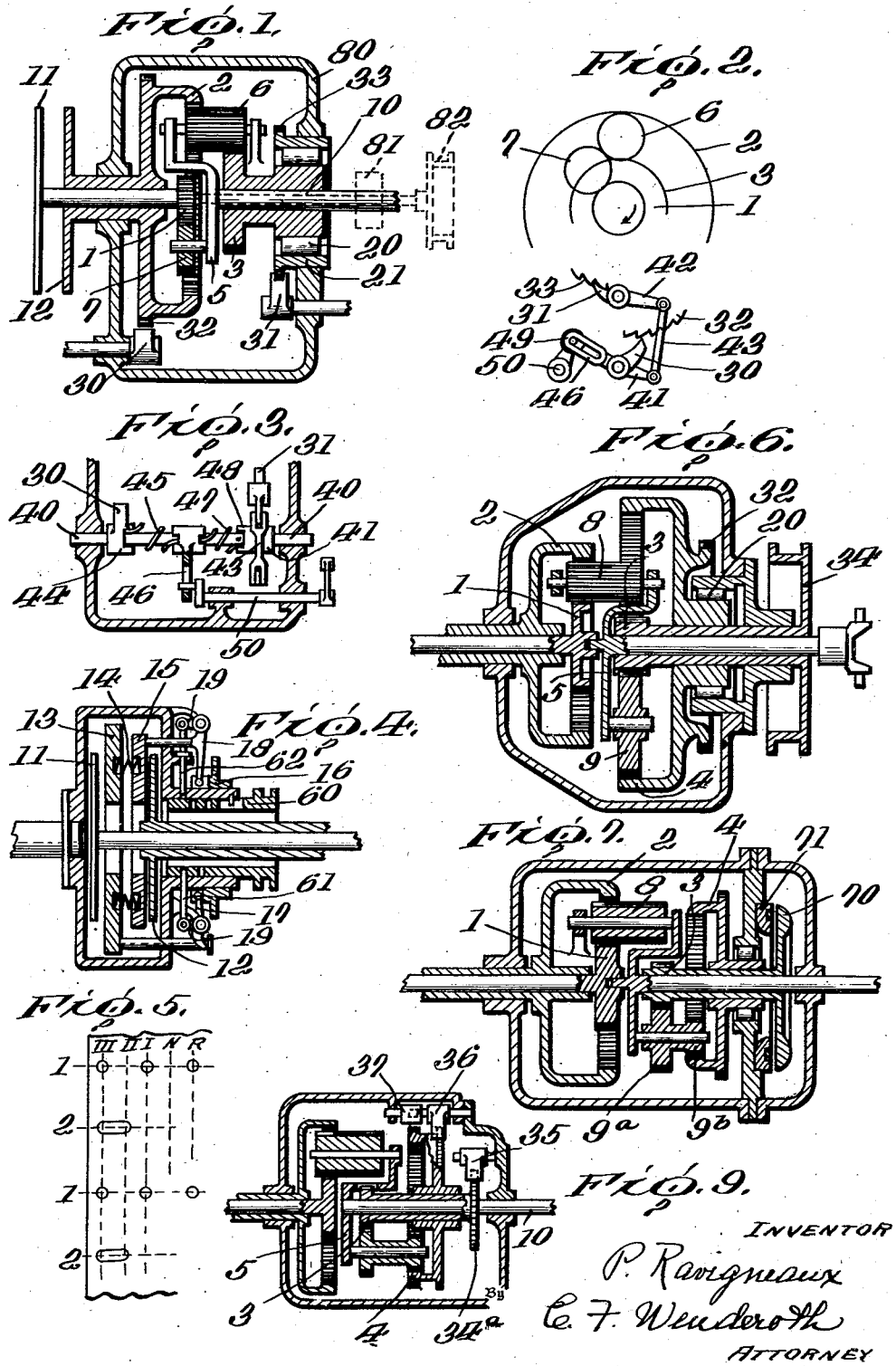

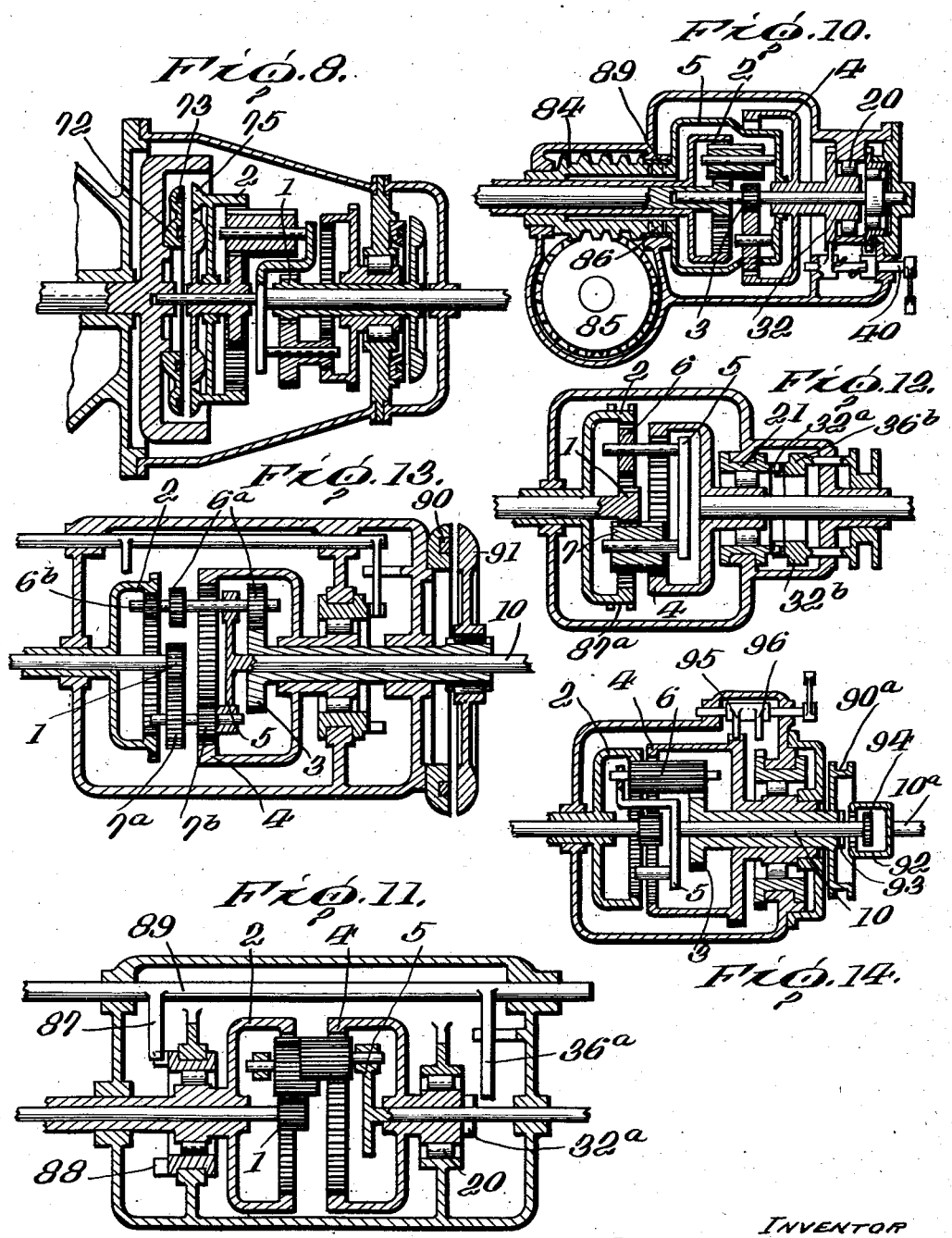

Patented Apr. 2, 1940

2,195,783

UNITED STATES PATENT OFFICE 2,195,783

GEAR BOX WITH FREE WHEELING GEAR

Pol Ravigneaux, Neuilly-sur-Seine, France

Application December 29, 1937, Serial No. 182,332
In France March 20, 1937

11 Claims. (Cl. 74—270)

The present invention deals with a gear box with complex epicycloidal trains suitable more especially for automotive vehicles. It comprises four or five concentric members with totally intermeshed elements.

The satellite of a first simple train formed with one pinion, one annulus with interior toothing and one satellite carrier, meshes with the satellite of another train, which has the same satellite carrier.

If the second train is identical with the first one, there are five concentric members, the two pinions, the two annuli and the satellite carrier. If in the second train the pinion or the annulus is eliminated, there are only four concentric members.

The system is called "totally intermeshed" because, on account of the meshings heretofore defined, when any one of the members is held stationary and in the meanwhile any other one is set into motion, every other member rotates with a predetermined speed.

In the speed changing device which constitutes this invention, the satellite carrier is always coupled with the propeller shaft, at least for all forward speeds.

Two other members, which can be either a pinion or an annulus, can be coupled individually with a driving shaft, by means of engaging devices, which generally are of the friction type.

These engaging devices or clutches can be located in the flywheel, or in the gear box casing or in any other location.

When the pinion and the annulus are alternately or simultaneously clutched and belong to the same simple planetary train, we shall from now on, in order to simplify the present description, call those planetary trains "direct". On the contrary, when the pinion and the annulus, to be clutched, do not belong to the same simple planetary train, we shall call them "crossed trains."

This denomination is chosen because, when the two trains are complete, it is necessary, in order to obtain the second arrangement, for the pinion and the annulus of one of the trains to be located on opposite sides with respect to the pinion and the annulus of the other train, the satellite of one of the trains crossing the zone where the meshing of another train takes place.

The planetary assembly herebefore defined gives, when composed of four members, one ratio by letting in one clutch when the free member is held stationary, and gives moreover a direct speed by operating the two clutches simultaneously, and at least one or two additional speeds can be obtained, if one of the clutchable members is held stationary, when the other one is clutched.

As a rule, in such a transmission where the driving and the driven shafts have the same axis of rotation, only one of the clutchable members can be reached in order to be held stationary. Therefore, the possible speeds are 2+1+1=4 in number, positive or negative ones, of which one is direct.

When the motion is received by or transmitted from the gear box laterally, one more speed can be obtained, or five speeds altogether. If the assembly is of five members, two more speeds can be obtained by holding stationary the member which could not be reached in the four members assembly, and by operating one or the other clutch. The speed ratios obtained with the arrangement described before, being functions one of the other, it is necessary to compute the number of teeth in each case in order to obtain acceptable values; these values will consist generally of one negative and several positive ratios, fractions or multiple of unity. A set of values in satisfactory graduation cannot be obtained in every case.

Several examples with numbers of teeth chosen for such results will be given hereafter. Obviously, these numbers may vary somewhat or be replaced by other ones proportional to the former numbers.

In the present description several arrangements will be shown in which one or several of the members will be held stationary by one way blocking devices, called free wheeling gears. This blocking by free wheeling gears of the members of a planetary gear box which must be held stationary and its application to the mechanisms defined previously constitute the main characteristic of the present invention. From the standpoint of kinematics a simple ratchet gear is the equivalent of a free wheeling gear; but, unless several ratchet gears act simultaneously, a transverse reaction is created, which does not occur with free wheeling gears, in which all loads are balanced.

In some particular cases, the ratchet gear alone will be sufficient. In other cases, as will be explained later on, a two-step blocking device will be designed, where a ratchet gear will be added to a free wheeling gear in order to set free the member controlled by the free wheeling. This result is obtained by discontinuing the blocking effect of the free wheeling. Sometimes, on the contrary, the one-way blocking effect of the free wheeling acting on one of the members of the train will be completed by a ratchet gear acting in the opposite direction, with the result of blocking securely the rotating member. In the arrangements, which are the objects of the present invention, the ratchet gear will generally be designed to create reactions between parts which are motionless relatively to each other only, and even between motionless parts, as for instance, between a stationary part and the casing.

The present invention uses free wheeling gears or ratchet gears as abutments for the reactions of the members held stationary. Sometimes the free wheeling can be released, when it becomes necessary to set free the corresponding member in order to obtain the desired ratio. The solutions presented in this application and making use of ratchet and free wheeling gears were conceived in such manner that, in all the scale of the forward speeds, it is not necessary while shifting to higher or lower gears, to disengage or engage that member of the free wheeling which is adjacent to the casing and which we may call the outer rim of the free wheeling. This is of great value on account of the impacts which would occur, and one of the advantages exclusive to the epicycloidal gear boxes would disappear, viz., to free the driver from the necessity of engaging claws or gears rotating at different relative speeds. In this invention the engaging or disengaging of the outer rim takes place only when shifting from first speed to the reverse. Out of this range, the driver effects all forward gear shifts by controlling a selector operating the clutches. Furthermore, the engagement or disengagement of the ratchet gears can be controlled by the same handle controlling the clutch selector, or by a separate lever or handle.

The main advantage of introducing free wheeling gears meeting the conditions previously stated, consists of eliminating all the planetary brakes, their controls, and the help of an outside energy, either to engage or disengage them. This description is made, referring to two satellites only, simple or stepped ones, in each arrangement; but it is obvious that most of the time several sets of satellites will be used, which has the advantage of balancing the loads on the shafts, on the pinions and on the annuli, and of freeing them from any radial loads. The free wheeling devices can be of any type and it is possible to replace them by other equivalent mechanisms, capable of stopping a rotation in one way only. I call main pinions, the gears centered on the shaft with exterior toothing, and annuli, the gears centered on the shaft with interior toothing. The invention will now be described with reference to the accompanying drawings, which are given solely by way of example, and in which:

Fig. 1 is a section through a planetary gear box with four concentric members (2 pinions, 1 annulus and 1 satellite carrier) with crossed trains, giving three speeds (3rd direct) and reverse, and including one over running clutch that can be totally released in reverse, and one ratchet gear.

Fig. 2 is a diagram of the pitch circles of the gears shown on Figure 1 with a side view of the control mechanism of the ratchet gears.

Fig. 3 shows this control in another projection.

Fig. 4 shows an arrangement with two selective clutches.

Fig. 5 is the flat development of the selecting sleeve with axial drive.

Fig. 6 shows a gear box with five members (two pinions, two annuli and one satellite carrier) with crossed trains, giving four speeds (3rd direct) and reverse, and including an over running clutch that can be totally released in reverse and one planetary brake.

Fig. 7 is a modification with electromagnet brake and one stepped satellite.

Fig. 8 is a further modification where the two clutches are of electromagnet type.

Fig. 9 shows a gear box with five members—direct trains—giving three speeds and one reverse and including three releasable ratchet gears.

Fig. 10 is a further modification, the mechanism being so designed as to transmit the rotation to a driven shaft located between the engine and the speed changing device, and the three releasable ratchet gears are replaced by two free wheeling gears and two ratchet gears.

Fig. 11 shows a gear box with four concentric members (two annuli, one pinion, one satellite carrier) with direct trains, giving three speeds and one reverse and including two releasable free wheeling gears and two non-rotating claws for stopping the corresponding member in both directions of rotation.

Fig. 12 is a gear box with 4 concentric members, having gears of the same nature, which are combined to operate as crossed trains. The release of the free wheeling gear is obtained by the axial sliding of a non-rotating claw.

Fig. 13 shows a gear box with 5 concentric members with crossed trains and stepped satellites, giving 5 speeds (5th direct) and one reverse, and including one releasable over running clutch, one non-rotating claw and one planetary brake.

Fig. 14 shows a modification with a simple satellite, where the reverse is obtained by changing the driven member, and which includes one releasable over running clutch, two ratchet gears and rotating claws for the reverse speed.

Figure 1 shows an epicycloidal gear box with 4 concentric members (2 pinions, one annulus and one satellite carrier) with crossed trains, and including one releasable free wheeling gear and one ratchet gear. The direct train comprises the pinion 3, the annulus 2, both meshing with the satellite 6, whose axis is supported by the flange 5, and the propeller shaft 10. This satellite 6 meshes with another satellite 7, supported by the same flange, and the satellite 7 meshes with another pinion 1.

The pinion 1 is provided with clutching means; it is, for instance, fastened to the disc 11 of a friction clutch, the coacting members of which are fastened to the crankshaft of the engine. In the same manner, the annulus 2 is coupled with the clutching member 12. As annulus 2 does not belong to the simple planetary train made of wheels 3—6—2, the system is one of "crossed trains." Between the pinion 3 which is not connected with the clutching members and the casing 80 is located a free wheeling device 20, preventing this pinion from rotating in the direction opposite to the engine direction, but leaving it free to rotate in the same direction as the engine. When for the lowest speeds, the pinion 1 is clutched with the engine, the satellite carrier 5 rotating with the car wheels acting as reaction, the gear 3 has a tendency to rotate in the opposite direction. As the free wheeling prevents this, it remains stationary and the transmission operates in the positive direction with a given gear ratio. When the annulus 2 is clutched the same action takes place and the transmission operates again in the opposite direction, but with another gear ratio. When the two clutches are operated simultaneously, this gives direct drive, and nothing opposes the positive rotation in which gear 3 is driven. The conditions of speed change, through the action of clutches only, are fulfilled for 3 forward speeds, one of which is direct drive. To obtain a reverse, it is necessary to prevent the annulus 2 from rotating in the positive direction; but it is necessary to let the gear 3 rotate in the opposite direction. To stop the annulus 2 in the positive direction, it is possible, for instance, to operate a pawl 30 on a ratchet wheel 32, fastened to the annulus 2, or any other mechanism preventing this annulus from rotating either in the positive direction only or in both directions. In order to free the gear 3 from the action of the free wheeling device 20, this free wheeling device 20 is released from the casing 80 on which it is supported. To secure this effect, the inner or outer rim of the free wheeling device, here the outer rim 21, will be mounted so as to be able to rotate in the casing, and in order that the gear 3 may rest upon it, this outer rim will be held stationary by a pawl 31 acting on the ratchet gear 33.

In Figures 2 and 3, the action of the two ratchet gears, one of which is engaged when the other is free, can be obtained by the same control. The ratchet gear is loose on axle 40. On the same axle is also loose, at the other end, a lever 41 connected with the ratchet gear 31, through the lever 42 and the link 43. When the two ratchet gears are set free, the relative position of each one of them with respect to the axle 40 is determined by a stop located on axle 40 and shown by the pins 44 and 48 on Figure 3, toward which those ratchets are pushed by springs 45 and 47. At their other end, these springs bear against the control bushing itself, on which the driver acts, when he wants to shift from neutral to the forward or reverse speeds. The control extends from a handle to a lever 46 mounted on the axle 40. When this lever 46 is pushed toward forward speeds, corresponding to Figures 2 and 3, while also raising it, the pawl 31 begins to touch its ratchet wheel; then lever 46 moving further, the spring 47 is put in torsion, while at the same time the stop 48, supporting the pawl, loses its contact with the spring, while it is given enough clearance in rotation to release itself from the ratchet wheel 33. Inversely, when acting in the opposite direction on lever 46, the pawl 30 engages with the ratchet wheel 32; its locating spring 45 serves as its operating spring. It is preferable to use a one-way control, at least for forward speeds, corresponding to the position shown on Figure 2. The driver controls the lever 46 by an eccentric handle 49, mounted on axle 50. The position of this handle can be such, for the forward speeds, that the tension in spring 47 has no action on the control. As an example, there is given hereinbelow one way to obtain a satisfactory scale of gear ratios, by taking the following numbers of teeth:

Pinion 1=18
Satellite 7=25 (arbitrary)
Pinion 3=39
Annulus 2=75
Satellite 6=18

Using combinations with three figures, the first figure giving the clutched member, the second one the stationary member, the third one the driven member, ratios $k_1$, $k_2$, $k_3$, $k_R$ are obtained:

| | |
|---|---|
| 1—3—5 | $k_1=0.316=1/3.16$ |
| 2—3—5 | $k_2=0.66=1/1.5$ |
| (1—2)—"—5 | $k_3=.1=1/1$ |
| 1—2—5 | $k_R=0.316=1/3.16$ |

When the transmission, instead of being effected concentrically to shaft 10, is done sidewise, as for instance through spur or bevel gear 81, it is possible to lengthen the shaft carrying pinion 1 and to brake this wheel 1 with a drum 82, for instance. The extension of this shaft, the gear 81 and the drum 82 are shown in dotted lines on Figure 1. Then by clutching 2, an additional speed, which is an overdrive is obtained. The speed ratio corresponding to the number of teeth chosen above is $k_4=1.316$.

Figure 4 shows an arrangement with two selector-clutches and Figure 5 shows the plane development of the sleeve selector. The assembly includes, in all, two friction-disc clutches of a well known type, but both are located in the same flywheel to obtain their respective release by the same control system. Disc 11 can be pressed to the left, against one face of the flywheel, by a disc 13 operated by spring 14, and disc 12 can be pressed to the right by disc 15 operated by other springs or the same spring 14. The release of the clutches is simultaneously done by axial sliding of the same collar 16. In order to free the discs 13 and 14 from the action of springs 14, it is necessary to locate the rotation axles of levers 17 and 18, for 17 inside of their connection to disc 13, and for 18, outside. It would be possible to arrange the discs and the counter disks so that the pressing of the discs shall be in the same direction, by having, for instance, an intermediary partition installed in the fly-wheel. As the two clutches must be engaged one after the other, there is provided a selector 60 controllable in a simple way, although it acts on rotating parts, and I eliminate, wherever possible, any axial loads between stationary and rotating parts, while at the same time a set of springs is compressed by an opposite load. These conditions are satisfied in the arrangement shown. The clutch levers of each set, such as 17 and 18, when in the position of release, drive by means of the small levers 19, the rods 61 and 62, the ends of which slide away from the axle. When the clutch release takes place, a sleeve 60 slides along the axle, and presents to the ends of the rods 62 solid or hollowed faces. When a groove is employed, the levers such as 17 or 18 can resume their position of clutching. With solid faces, on the contrary, these levers 17 or 18 must stay in the clutch-release position, and no reciprocal action between rotating and stationary parts results, when the pressure on the clutch pedal is released. The action of the springs results in a pressure between the ends of the rods 62 and the sleeve 60, both parts rotating together. As soon as the levers of one system are lowered into the grooves of sleeve 60, this sleeve which operates as a selector is thus locked. Instead of giving to the sleeve 60 a simple axial motion, a slight rotation can be added to it, thus resulting in a helicoidal motion, which presents the advantage of reducing the axial sliding movement.

Figure 5 shows the plane development of a selector designed for the arrangement of Figure 1. The solid and hollowed pathway corresponding to the levers of the system connected to disc 11 and to members denoted 1 on Figure 1, are represented above opposite to the reference 1. Underneath is the view of the selector zone corresponding to the rods of the other system; and so on. The speeds are denoted by I, II, III, neutral by N, and reverse by R, at the top of the vertical lines. For the levers of system 1, there is used between the positions of 2nd and 3rd, speeds a continuous groove, connecting two holes. This disposition is not essential but is given only as an illustration. In the system of speed change described, I must point out the possibility of shifting from direct drive to the lower speed without moving the selector handle from its direct drive position. When the clutch adjustment is made the member 101 first releases the clutch which does not enter into action in 2nd speed. When the clutch is released without pushing the pedal clear down, this gives the 2nd speed clutch, and the free wheeling gear renders the corresponding member stationary. It is then possible to shift again to direct drive merely by raising the pedal.

Figure 6 shows a gear box with 5 members (2 pinions, 2 annuli and one satellite carrier) with direct trains, giving 4 speeds (3rd direct) and reverse, and including one releasable over running clutch and one brake. In this arrangement, with direct trains, pinion 1 is connected with one clutch element; the annulus 2, connected to the other, is part of the same simple train. The second train is connected to the first train, as in the arrangement of Figure 1, on account of the presence of a satellite carrier common to the two trains, and the meshing of the satellites together. The diagram of the pitch circles has not been shown for this figure, or the following figures. The drawings show a zone, in which the satellites can mesh together, without touching either the pinion or the annulus of the other system; but in order to make the description clearer, the two satellites are designed as projected in the plane of the drawings.

In Figure 6, the meshing of the satellites occurs in the zone in which the second train meshes, as the satellites of the first train clears the two gears.

By using, for instance, the following numbers of teeth:

Pinion 1=30     Pinion 3= 18
Annulus 2=64    Annulus 4=110
Satellite 8=17  Satellite 9= 46

Or by using the combination of speeds denoted by the conventional symbols, the following ratios are obtained:

1    2—4—5—    $k_1=0.368$
2    1—3—5     $k_2=0.625$
3    (1+2)"—5  $k_3=1$
4    2—3—5     $k_4=1.39$
R    1—4—5     $k_R=0.375$

These ratios are evenly scaled down and correspond to practical needs. The annulus 4, in all forward speeds, is prevented from rotating in the reverse direction by a ratchet or a free wheeling device. A free wheeling device is shown in this case, and it operates as a stop mechanism only for first speed; for the other speeds, it rotates freely in the positive direction. For reverse speed, it must be held stationary, at least in the positive direction, but there is no inconvenience when it is also held stationary in the reverse direction too. It is therefore not necessary in this case to provide for a device for the complete release of the free wheeling device; it will be sufficient to lower upon this wheel a stop rod as shown at 30 on Figure 1. This rod will engage a ratchet wheel 32. For the 2nd speed geared down, and the 4th geared up, in which there are reactions in the opposite direction, I use for stopping the pinion 3, a brake, for instance, which can operate in one direction or the other on a drum 34, or on a disc, or on any other stopping device of the friction type, operating in both directions.

Figure 7 shows an alternate construction to Figure 6. The braking is obtained by attracting an armature 70, mounted on gear 3, against the face of a stationary electromagnet 71. To reduce the size of annulus 4, satellite 9 represented on the preceding figure consists of two parts $9^a$ and $9^b$ as a stepped down satellite. By using for instance the following numbers of teeth:

Pinion 1=39       Pinion 3=21
Annulus 2=81      Annulus 4=66
Satellite 8=21    Satellite $9^a$=30
                  Satellite $9^b$=15

I obtain, for the combinations of speeds (using the conventional symbols) the following speed ratios:

1         2—4—5      $k_1=0.38$
2         1—3—5      $k_2=0.65$
3    (1+2)—"—5      $k_3=1$
4         2—3—5      $k_4=1.35$
R         1—4—5      $k_R=-0.42$

The stepping of satellite 9 permits reducing the diameter of the annulus diameter, and at the same time increasing the diameter of pinion 3, which must be of sufficient size to let the propeller shaft go through. It has also the advantage, if desired, of obtaining within a smaller space a first speed of a smaller ratio. The means, not shown, which controls the selector, can be coactive also with the control of the ratchet gear and of the electric contact which controls the stopping of wheel 3.

Figure 8 is an alternate to Figure 7, in which both clutching operations are performed by two electromagnets 72 and 73 respectively, coactive with armatures 74 and 75, which are respectively fastened to pinion 1 and annulus 2. The other details of this figure are identical with the corresponding details of Figure 7.

Figure 9 shows a gear box with 5 members, with direct planetary trains, giving 3 speeds and a reverse, and including 3 releasable ratchet gears. This alternate is a modification of the arrangements of Figures 6 and 7; but the number of forward speeds is reduced to 3, and the brake on member 3 is eliminated. The result is the elimination of the overdrive, and pinion 3 is stopped against rotation in the reverse direction only. As an illustration, all the one-way stops are obtained in this figure by ratchet gears. The pawl 35 operates on the ratchet gear $34^a$ and the pawl 36 operates in the negative direction for the forward speeds, and ratchet gear 37 operates in the positive direction for the reverse, and they enter in turn into action. I can use for the various gearings the same numbers of teeth as in the arrangement of Figure 7. The speeds are obtained with the same combinations. During the operation of all forward speeds, the ratchet gears 35 and 36 enter into play as stops in the reverse direction. In reverse gear, I raise the pawl 35 and put 75 ratchet gear 37 into action. Ratchet gear 36 can remain engaged.

Figure 10 shows an alternate form to Figure 9, with the mechanism designed for transmission of the rotation to a propeller shaft located between the engine and the gear box and the three releasable ratchet gears being replaced by two over running clutches and two ratchet gears. Free wheeling device 20 and ratchet gear 32 have the same function as in Figure 6 regarding annulus 4, but the pinion is stopped by a ratchet gear as in Figure 9. The control of the two ratchet gears can be effected in the same manner as shown in Figures 2 and 3; but this assembly is simpler since the control through levers 41 and 42 and the connecting rod 43 can be eliminated. The driver may act directly on lever 83 secured to axle 40. Springs 45 and 47 are replaced by a single spring. The satellite carrier 5 surrounds the annulus 2 and drives a worn gear 84 meshing with gear 85, which, in an automobile, supports the differential. The driving of the worm gear by the satellite carrier may be obtained through a centering sleeve 89, which rotates in the casing, by means of two sets of rotating claws 86 respectively fastened to parts 5 and 84.

Figures 11 and 12, the first having direct trains and the second having crossed trains demonstrates that this invention can be applied to a gear box having only 4 members, of which two are annuli and one is a pinion. Figure 12 is a modification of Figure 6 having direct trains and shows a gear box with four concentric members (two annuli, only one pinion and one satellite carrier), giving 3 speeds and one reverse. It includes two free wheeling devices, one of which is releasable, and two nonrotating claws, with the following numbers of teeth:

Pinion 1=18   Annulus 4=90
Annulus 2=90  Satellite as desired
Satellite 6=36

The following speed ratios can be obtained, using the conventional symbols:

1   1—2—5      $k_1=0.16$
2   2—4—5      $k_2=0.50$
3   (1+2)—"—5  $k_3=1$
R   1—4—5      $k_R=-0.25$

This arrangement is particularly convenient when a very low first speed is required. Annulus 4, which is for all forward speeds stopped against reverse rotation by a free wheeling device 20, is held stationary in reverse drive by the non-rotating claw 36a engaging with rotating claws 32a having the same function as ratchet wheel 32 in Figure 6. Annulus 2 is also stopped by a free wheeling device against reverse rotation; but this free wheeling device is set free in reverse drive by disengaging another non-rotating claw 87, which in forward speeds remains engaged with rotating claws 88. The control for the motion of these two claws can be effected simultaneously by the operation of a rod 89 moving parallel to the axis. Figure 12 shows an assembly composed of the same elements as those in the arrangement shown in Figure 11; but these are combined to operate as crossed trains, as the clutchable wheels do not belong to the same simple train.

Using, for instance, the following numbers of teeth:

Pinion 1=18   Annulus 4=54
Annulus 2=78  Satellite 7=18
Satellite 6 as desired

The following ratios can be obtained with the combinations represented by the conventional symbols:

1   1—4—5      $k_1=0.25$
2   2—4—5      $k_2=0.59$
3   (1+2)—"—5  $k_3=1$
R   1—2—5      $k_R=0.30$

The satellites can mesh in the zone in which pinion 1 and annulus 2 are located, provided that satellite 6, the number of teeth of which is arbitrary, be taken sufficiently small to clear the teeth of pinion 1. The annulus 4, which must be held against any reverse rotation in all forward speeds, is mounted for free wheeling. The stationary part 21 of this free wheeling device is maintained in this state by rotating claws 32a engaged with claws 32b, secured to a stationary part 36b. In reverse, these claws are disengaged by sliding 36b to the right. Annulus 2 can be held stationary at this time, for instance, by a band acting on a brake drum 87a.

Figure 13 shows a gear box, with 5 concentric members, the crossed trains and satellites of each set being stepped. It gives 5 speeds (5th direct) and a reverse, and includes a releasable free wheeling device, a non-rotating claw and brake. Both sets of satellites are stepped in order to obtain a very low first speed ratio. Satellite 6 of Figure 1 (also with crossed trains) comprises two others 6a and 6b. In the same manner, satellite 7 comprises 7a and 7b. In the zone located immediately to the right of annulus 2, satellite 6a meshes with satellite 7a of the other train, using for instance, the following numbers of teeth:

Pinion 1=18     Pinion 3=51
Annulus 4=90    Annulus 2=90
Satellite 7a=43 Satellite 6a=24
Satellite 7b=29 Satellite 6b=15

The following ratios can be obtained with the combinations represented by the conventional symbols:

1   1—4—5—     $k_1=0.118$
2   1—3—5—     $k_2=0.26$
3   2—4—5      $k_3=0.52$
4   2—3—5      $k_4=0.74$
5   (1+2)—"—5  $k_5=1$
R   1—2—5      $k_R=-0.143$

Annulus 4, which must be held stationary against reverse rotation in 1st and 3rd speeds is mounted with a free wheeling device releasable in reverse drive. In 3rd, 4th, and 5th, (forward) speeds, this annulus can rotate freely in the positive direction of rotation. Pinion 3, which must be held stationary against reverse rotation, in 2nd and 4th speeds, could not be mounted with free wheeling device if it were disengaged during the change of combinations occurring in forward speeds, viz., in 1st and 3rd because at this time it must be free to rotate in the reverse direction. This would not comply with the conditions imposed in the problem. Therefore, this pinion is connected to a braking device operating by friction. In this figure the braking is produced by attraction of armature 91, secured to the pinion 3, by the electromagnet 90.

Figure 14 is an alternate form to Figure 13, but with simple satellites. For the forward speeds, the operation is identical. On the contrary, the reverse drive is obtained by the combination (1-4-3) and requires a change in the coupling of shaft 10a, which is connected by claws 92 with claws 93, in opposition to the forward speeds, when the said shaft 10ᵃ is connected to the claws 94 secured to the satellite carrier 5 and of the shaft 10, using for instance, the following number of teeth:

Pinion 1=16    Pinion 3=26
Annulus 4=50   Annulus 2=58
Satellite 7=17 Satellite 6=16

The following ratios can be obtained with the combinations represented by the conventional symbols:

| 1 | 1—4—5 | $k_1 = 0.24$ |
| 2 | 1—3—5 | $k_2 = 0.38$ |
| 3 | 2—4—5 | $k_3 = 0.54$ |
| 4 | 2—3—5 | $k_4 = 0.69$ |
| 5 | (1+2)—"—5 | $k_5 = 1$ |
| R | 1—4—3 | $k_R = -0.223$ |

Annulus 4, which must be held stationary against reverse rotation in 1st and 3rd speeds, is mounted with a free wheeling device. In reverse drive the ratchet gear is engaged. If it were desired in reverse drive to have the car in free wheeling, it would be possible to release the free wheeling of forward speed by a ratchet gear 96, whose motion can be controlled by the motion of ratchet 95.

In order to classify the various alternate forms of this invention, which have been described, it is pointed out that the arrangements with direct trains are those represented on Figures 6, 7, 8 and 9, and 10, which include two complete planetary trains, and the arrangement of Figure 12 which includes two annuli but only one pinion. Also, the arrangements with crossed trains are those represented on Figures 13 and 14, which include two complete planetary trains, and the one represented on Figure 1, which includes two pinions and only one annulus, and Figure 13, which includes two annuli and only one pinion.

I claim:

1. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, planetary pinions adapted to connect the three said wheels in such manner that the rotation of one wheel will effect the rotation of the other two wheels when the planetary pinion carrier is in the stationary position.

2. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a planetary pinion which meshes with the said annulus, with a pinion, and with a second planetary pinion engaging the third gear-wheel.

3. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a planetary pinion which meshes with the said annulus, with a pinion, and with a second planetary pinion engaging the third gear-wheel, which is a pinion.

4. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a planetary pinion which meshes with the said annulus, with a pinion, and with a second planetary pinion engaging the third gear-wheel, which is an annulus.

5. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a selector for the two clutches whereby they may be simultaneously clutched in order to provide for the direct drive.

6. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a device for releasing the third wheel of the overrunning clutch, and a device for holding, at least in the driving direction, the annulus adapted for clutching, in order to obtain a reverse drive by means of the same wheels as are used for the forward drive.

7. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a device adapted for the release of the two clutches by a common control.

8. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a device adapted for the release of the two clutches by a common control, this device being such that one unclutching action will take place before the other.

9. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, a selector which is rotatable with the motor and is adapted for axial movement, said selector comprising solid parts and cut-out parts, the solid parts serving for the radial support of members which are movable together with the devices of each clutching mechanism in order to prevent them from returning to the clutching position by the action of the springs employed for this clutching.

10. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, which is an annulus, the said epicyclic assembly further comprising a fourth gear-wheel consisting of a pinion engaging the second planetary pinion aforesaid, and means for stopping the said pinion.

11. A gear box comprising an epicyclic assembly comprising a single planetary pinion carrier secured to a driven device adapted for all forward speeds, of at least three gear wheels, pinions and annuli, which are loose and are rotatable about the axle of the planetary pinion carrier, these three wheels comprising at least one annulus with internal teeth, means for clutching with the said annulus and with one of the said pinions by which they may be connected selectively with a driving device, an overrunning clutch acting upon the third wheel and permitting it to rotate only in the driving direction, which is an annulus, the said epicyclic assembly further comprising a fourth gear-wheel consisting of a pinion engaging the second planetary pinion aforesaid, and means for stopping the said pinion and means for stopping the annulus in addition to the over-running clutch which acts upon the same in a single direction.

POL RAVIGNEAUX.